United States Patent [19]

Huang

[11] Patent Number: 5,238,092
[45] Date of Patent: Aug. 24, 1993

[54] SPRING LEG OF A CHASSIS OF A MOTOR VEHICLE

[75] Inventor: Zhen Huang, Wuppertal, Fed. Rep. of Germany

[73] Assignee: August Bilstein GmbH & Co. KG, Ennepetal, Fed. Rep. of Germany

[21] Appl. No.: 840,744

[22] Filed: Feb. 24, 1992

[30] Foreign Application Priority Data

Mar. 7, 1991 [DE] Fed. Rep. of Germany ....... 4107292

[51] Int. Cl.[5] .............................................. B60G 17/01
[52] U.S. Cl. .................................... 188/299; 280/707
[58] Field of Search ................. 188/1.11, 267, 280, 188/284, 285, 299; 280/707; 73/11, 118.1, 526, 574, 658

[56] References Cited

U.S. PATENT DOCUMENTS

| | | | |
|---|---|---|---|
| 4,141,236 | 2/1979 | Ellington | 73/11 |
| 4,726,453 | 2/1988 | Obstfelder et al. | 188/299 X |
| 4,817,928 | 4/1989 | Paton | 267/221 X |
| 4,949,573 | 8/1990 | Wolfe et al. | 188/299 X |
| 5,009,450 | 4/1991 | Herberg et al. | 280/707 |
| 5,020,781 | 6/1991 | Huang | 280/707 X |

FOREIGN PATENT DOCUMENTS 2629005 12/1977 Fed. Rep. of Germany ........ 73/658

Primary Examiner—Andres Kashnikow
Assistant Examiner—Kevin D. Rutherford
Attorney, Agent, or Firm—Max Fogiel

[57] ABSTRACT

The invention concerns a one-tube or two-tube shock-absorbing leg for the chassis of a motor vehicle. It has a sensor that measures the difference between the speed of the vehicle's body and that of its axis. The sensor comprises a winding and a permanent magnet. The sensor is accommodated such that the shock-absorbing leg's helical spring cannot affect the results.

10 Claims, 7 Drawing Sheets

SPRING LEG OF A CHASSIS OF A MOTOR VEHICLE

BACKGROUND OF THE INVENTION

The invention concerns a one-tube or two-tube shock-absorbing leg for a semi-active chassis in a motor vehicle. The leg consists of a cylindrical tube demarcated by a base at the bottom and by a piston-rod aperture at the top. The base of the two-tube embodiment has a valve. A piston is attached to the piston rod. The piston contains valves. The piston divides the cylindrical tube into two force-transmission chambers. The leg also has a spring plate that accommodates a helical spring. The plate is mounted on the cylindrical tube in the one-tube embodiment and on an outer tube that surrounds the cylindrical tube in the two-tube embodiment. A traction limiter above the piston on the piston rod demarcates how far the wheel can emerge. Shock-absorbing legs of this type are employed as linkages to accommodate effective bending moments and to transmit vibrations from the surface of the road to the body of the vehicle by way of the suspension system, especially that of the forward axle. To ensure a comfortable ride and increase safety, shock-absorbing legs with semi-active or active vibration-suppression controls are often employed. For this type of control it is necessary to measure a wide range of motion variables such as the speed of the axis in relation to that of the body or the acceleration of the body and to forward them to controls that emit a parameter for varying the level of vibration suppression. German Patent 3 909 190 describes a relative-speed sensor for a dashpot. The sensor consists of a cylindrical coil accommodated in a jacket attached to the piston rod and of a permanent magnet at the end of the cylinder that the piston rod extends through. The voltage induced in the sensor's coil is employed as an indication of relative speed. Although such a sensor will operate very precisely in a dashpot, it would when employed in a shock-absorbing leg lead to false measurements that would make regulation impossible. This is because the helical spring mounted on the spring plate in a shock-absorbing leg also acts as a coil. The motion of the spring in relation to the sensor coil and the varying width of the spring windings would accordingly generate inductive interference that could not be compensated for by electronic processing. Shock-absorbing legs also take up too much space to allow the use of jackets or protective rubber bellows that would accommodate a state-of-the-art sensor winding.

SUMMARY OF THE INVENTION

The object of the present invention is accordingly an improved shock-absorbing leg for a semi-active chassis. It will be possible to measure the speed of the axis in relation to that of the body. No complicated and expensive sensors will be needed. The relative speed will be employed as a parameter for varying the level of vibration suppression. Any inductive interference from the spring will have no effect on results.

This object is attained in accordance with the invention by a shock-absorbing leg for a semi-active or active chassis by the characteristics recited in the claims. The sensor winding will preferably surround the piston rod below the traction limiter. The permanent magnet is mounted against the inner surface or in the wall of the cylindrical tube. Electric connections extend out through the hollow piston rod. The sensor winding in one advantageous embodiment is accommodated axially inside a hollow piston rod of non-magnetic material. The cylindrical tube can also be of a non-magnetic material. It is of advantage in this event to secure the magnet to the outer surface of the cylindrical tube or to the inner surface of the outer tube. It is also of advantage in that event for the sensor winding to be a cylindrical coil accommodated between the outer surface of the cylindrical tube and the inner surface of the outer tube. Still another advantage can then be obtained by mounting the permanent magnet on the piston rod.

BRIEF DESCRIPTION OF THE DRAWINGS

One embodiment of the invention will now be specified by way of example with reference to the drawing, wherein.

DESCRIPTION OF THE PREFERRED EMBODIMENTS

Figure 1:
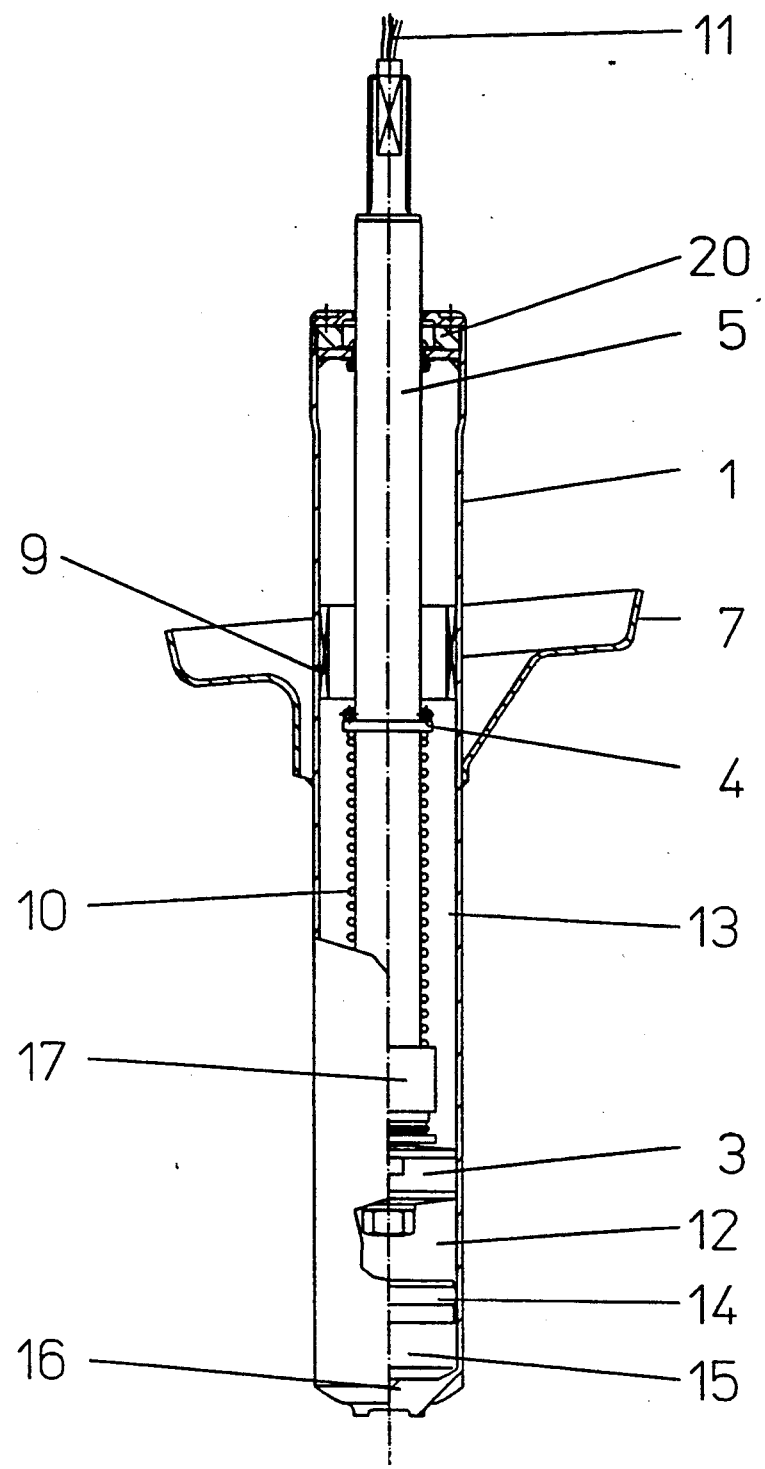
FIG. 1 illustrates a one-tube embodiment of shock-absorbing leg with a sensor winding around the piston rod, FIG. 2 a two-tube embodiment with a sensor winding inside a hollow piston rod and a permanent magnet secured to the cylindrical tube, and FIG. 3 a two-tube embodiment with a sensor winding against the outer surface of the cylindrical tube and a permanent magnet secured to the piston rod.

An adjustable one-tube shock-absorbing leg is illustrated in FIG. 1. It consists essentially of a cylindrical tube 1 demarcated at the bottom by a base 16 and at the top by a tightly sealed piston-rod aperture 20 and of a piston rod 5 that travels in and out of the cylindrical tube and terminates in a vibration-absorbing piston 3. The piston has variable valves and divides the interior of cylindrical tube 1 into two force-transmission chambers 12 and 13. Lower force-transmission chamber 12 is demarcated by a partitioning piston 14. A gas-filled compensation chamber 15 compensates for expansion and reduction in the capacity of the hydraulic-force transmission chamber due to the entering and exiting piston rod 5. Also mounted on cylindrical tube 1 is a spring plate 7. Mounted on spring plate 7 is a helical spring. The plate can be removable or welded tight to the tube. A traction limiter 4 mounted on piston rod 5 demarcates how far the wheel can travel out.

A sensor winding 10 in the form of a cylindrical coil surrounds piston rod 5 below traction limiter 4. The coil's connections 11 enter the hollow piston rod 5 just below traction limiter 4 and extend freely out of it. A permanent magnet 9, an annular magnet for example, surrounds the sensor winding and is mounted against the inner surface of cylindrical tube 1. When a wheel travels out due to an irregularity in the road, cylindrical tube 1 is pulled down and magnet 9 will travel down around sensor winding 10. The motion will induce in the winding a voltage proportional to the speed of piston 3 in relation to cylindrical tube 1.

Figure 2:
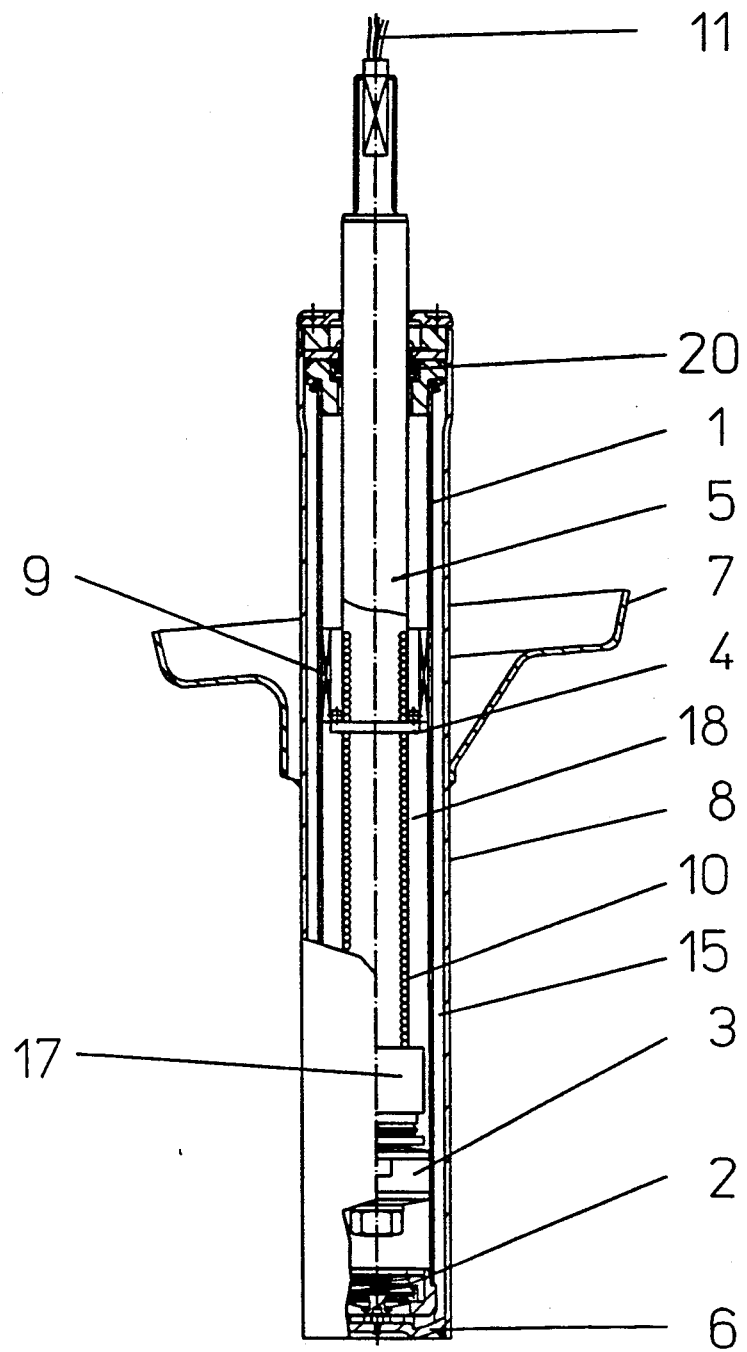

The shock-absorbing leg illustrated in FIG. 2 is a two-tube embodiment. It consists of a force-transmitting chamber 18 in the form of cylindrical tube 1. It is demarcated at the bottom by a base valve 2 and at the top by a tightly sealed piston-rod aperture 20. A piston rod 5 slides in and out through aperture 20. The end of the rod inside force-transmitting chamber 18 is secured to a vibration-absorbing piston 3 provided with adjustable valves 17. Cylindrical tube 1 is surrounded by an outer tube 8. A compensation chamber 15 approximately half full of oil is between the two tubes. Force-transmitting chamber 18 is completely full of oil. Outer tube 8 connects piston-rod aperture 20 to a cap 6. The base valve rests on cap 6. Resting on outer tube 8 is a plate 7 supporting an unillustrated helical spring. Piston rod 5 is of non-magnetic material, chrome-nickel-steel alloy for example. A traction limiter 4 that demarcates how far the wheel can travel out is mounted on piston rod 5. Sensor winding 10 can accordingly be accommodated axially inside the hollow piston rod 5 with its connections extending out to the processor. The permanent magnet 9 that generates the induced voltage in this embodiment is again mounted against the inner surface of cylindrical tube 1. It is, however, also possible to make the cylindrical tube itself of non-magnetic material and position magnet 9 between the outer surface of cylindrical tube 1 and the inner surface of outer tube 8.

Figure 3:
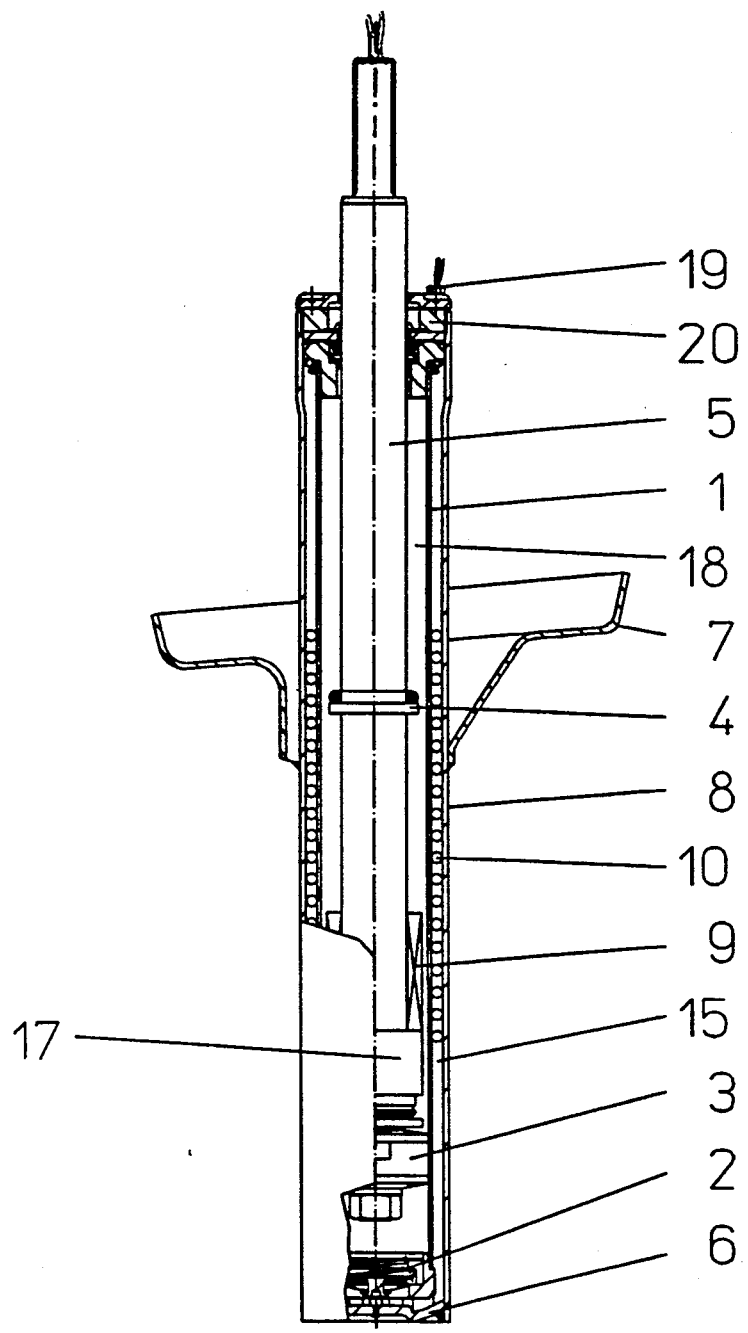

FIG. 3 illustrates a two-tube embodiment with a reverse structure. A sensor winding 10 determines the speed of the vehicle's body in relation to that of its axis. This winding is mounted against the outer surface of a non-magnetic cylindrical tube 1. The winding, however, could conceivably be mounted instead against the inner surface of outer tube 8. The windings' connections 11 in this embodiment extend out into compensation chamber 15 to a multiple-pin plug 19 in piston-rod aperture 20. The preferably annular permanent magnet 9 securely surrounds piston rod 5 above magnetic valve 17.

It is not absolutely necessary for the piston rod 5 in the versions illustrated in FIGS. 1 and 3 to be non-magnetic. The sensing system compensates for the effect of the rod in the unillustrated processor. The effect of the cylindrical tube 1 in the versions illustrated in FIGS. 1 and 2 can also be calculated and corrected. A supporting spring with a variable winding width will not affect the results in such an embodiment. The sensor that measures the difference between the speed of the vehicle's body and that of its axis in such an embodiment will be simple, protected, and exposed to little stress with no decrease in the stroke of the shock-absorbing leg.

Figure 4:
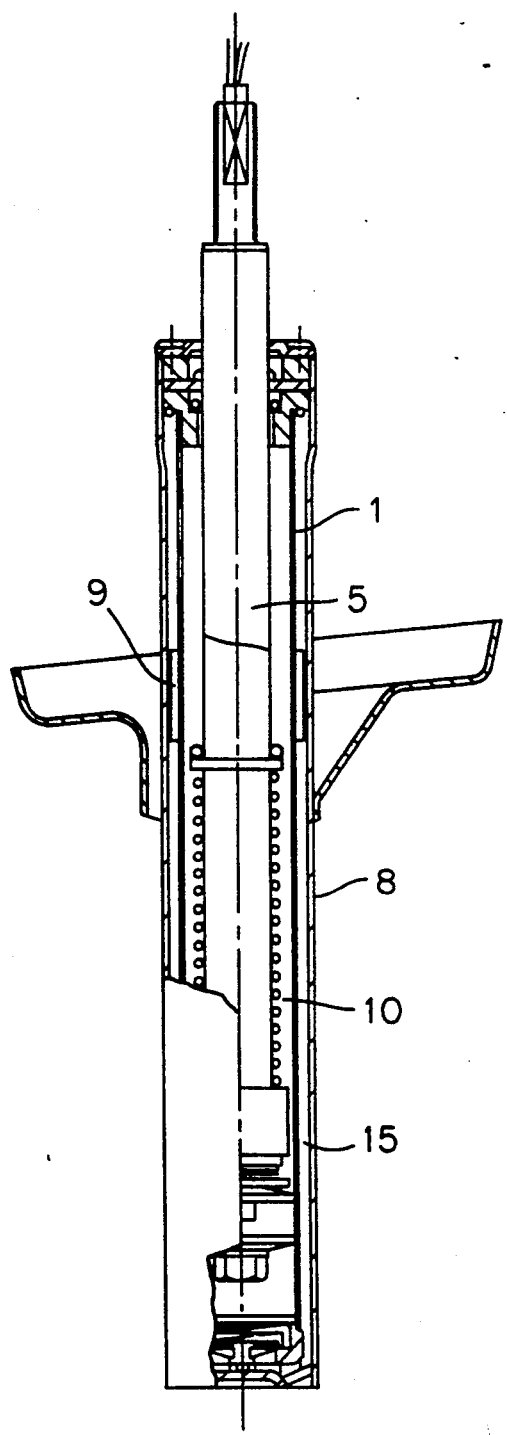
FIGS. 4–7 illustrate additional embodiments of FIG. 1, in accordance with the present invention.
Figure 6:
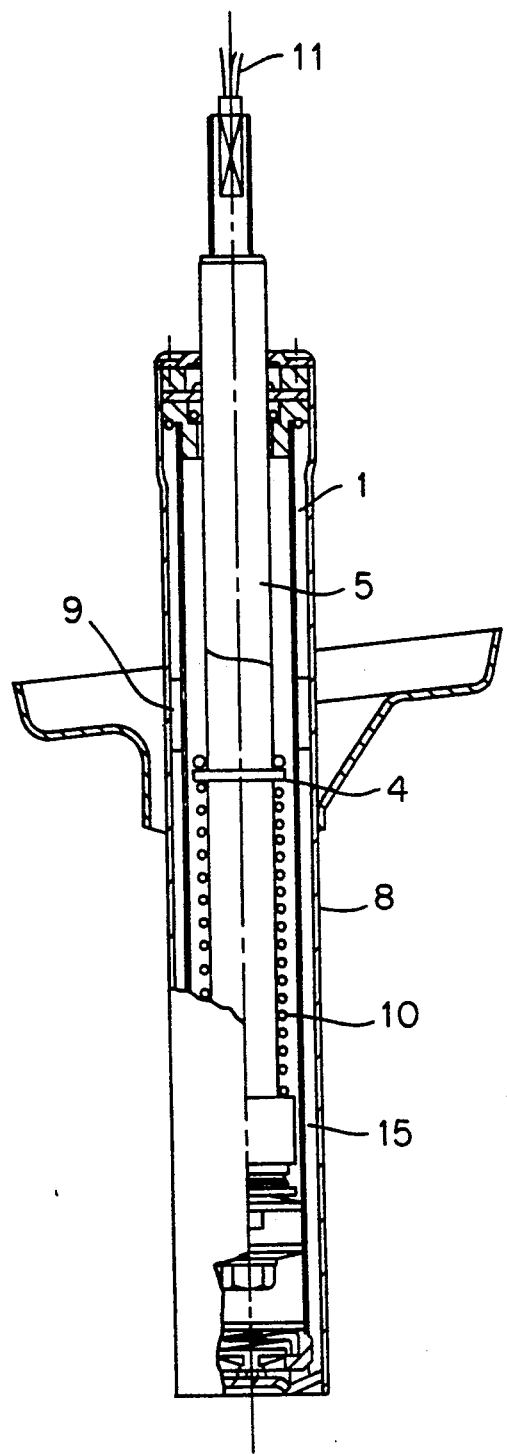

In the sensors of FIGS. 4 and 6, the sensor winding 10 surrounds the piston rod 5, which is preferably made of magnetic material, below the traction limiter 4. At the same time, the connections 11 of the sensor winding 10 are introduced shortly below the traction limiter and into the hollow piston rod 5. From there, the connections are passed to the outside. The permanent magnet 9 which surrounds the sensor winding is arranged in the compensation chamber 15. It is possible thereby to arrange the magnet at the outer wall of the cylinder 1 or on the inner wall of the outer cylinder 8, shown in FIG. 6. There is the condition, however, that the cylinder 1 is made of non-magnetic material.

Figure 5:
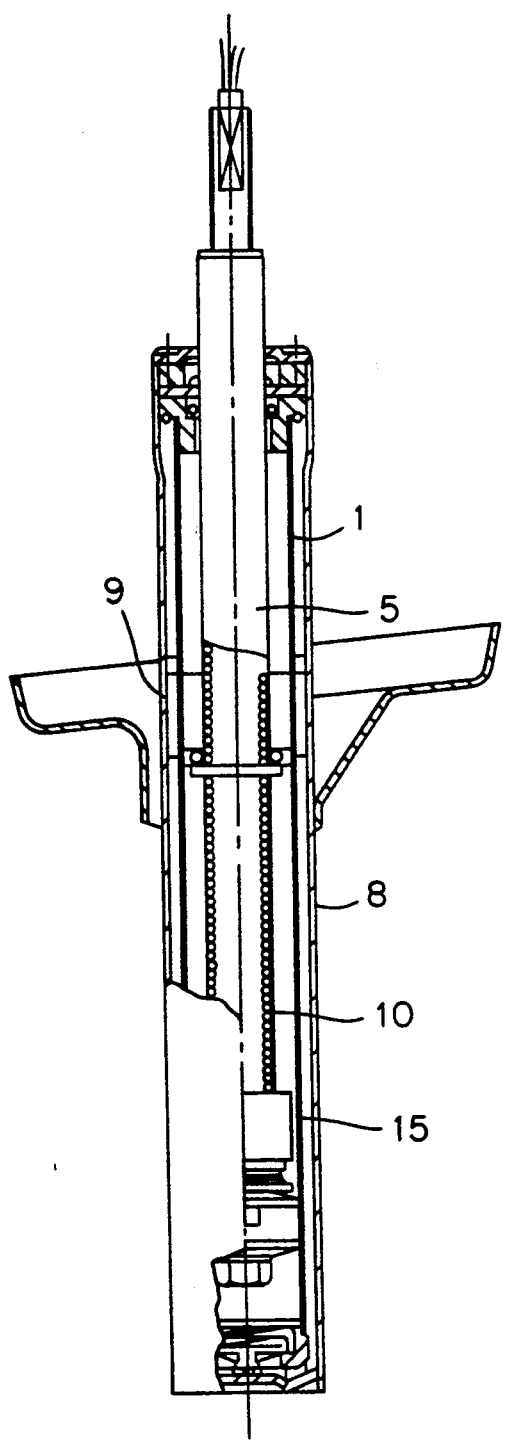
Figure 7:
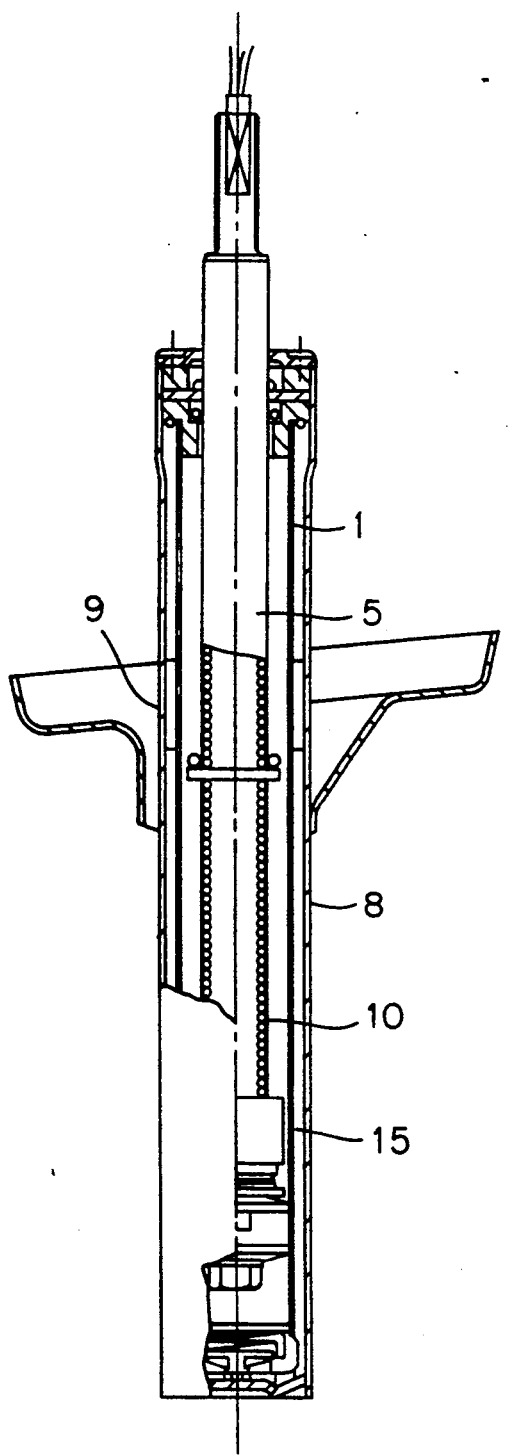

FIGS. 5 and 7 illustrate embodiment of the sensor in which the piston rod 5 receives the sensor winding 10. This piston rod is here made of non-magnetic material, as for example chromium-nickel-steel. The permanent magnet 9 is also located here in the compensation chamber 15 between the non-magnetic cylinder 1 and the outer cylinder 8. In accordance with FIG. 5, the permanent magnet 9 is connected with the cylinder 1, whereas in accordance with FIG. 7, the magnet 9 is connected with the outer cylinder 8.

I claim:
1. A shock-absorbing leg for a chassis of a motor vehicle, comprising: a cylindrical tube having one end with an aperture and another end with a base; a hollow piston rod connected to a piston and movable into and out of said cylindrical tube; a traction limiter mounted on said piston rod for limiting movement of said cylindrical tube relative to said piston rod; a relative-speed sensor with a cylindrical coil winding mounted relative to said movable piston rod and said traction limiter; a permanent magnet operating cooperatively with said coil winding inside said cylindrical tube; said coil winding having connections extending out through said hollow piston rod, said permanent magnet being connected to said cylindrical tube.

2. A shock-absorbing leg as defined in claim 1, wherein said cylindrical tube is of non-magnetic material.

3. A shock-absorbing leg as defined in claim 2, wherein said magnet is mounted against an outer surface of said cylindrical tube.

4. A shock-absorbing leg as defined in claim 2, including an outer tube surrounding said cylindrical tube, said magnet being mounted against an inner surface of said outer tube.

5. A shock-absorbing leg as defined in claim 1, wherein said coil winding surrounds said piston rod below said traction limiter.

6. A shock-absorbing leg as defined in claim 1, wherein said piston rod is of non-magnetic material, said coil winding being located axially in said hollow piston rod.

7. A shock-absorbing leg as defined in claim 1, wherein said magnet is mounted against an inner surface of said cylindrical tube.

8. A shock-absorbing leg as defined in claim 1, wherein said magnet is mounted in a wall of said cylindrical tube.

9. A shock-absorbing leg as defined in claim 1, wherein said leg comprises a two tube leg; said base having a valve; an outer tube surrounding said cylindrical tube; a plate mounted on said outer tube; and a helical spring mounted on said plate, and located outside a space between said magnet and said coil winding for eliminating measuring inaccuracies by said sensor due to action of said spring.

10. A shock-absorbing leg for a chassis of a motor vehicle, comprising: a cylindrical tube having one end with an aperture and another end with a base; a hollow piston rod connected to a piston and movable into and out of said cylindrical tube; a traction limiter mounted on said piston rod for limiting movement of said cylindrical tube relative to said piston rod; a relative-speed sensor with a cylindrical coil winding mounted relative to said movable piston rod and said traction limiter; a permanent magnet operating cooperatively with said coil winding inside said cylindrical tube; said coil winding having connections extending out through said hollow piston rod, said permanent magnet being connected to said cylindrical tube; said leg comprising a two tube leg; said base having a valve; an outer tube surrounding said cylindrical tube; a plate mounted on said outer tube, a helical spring mounted on said plate and located outside a space between said magnet and said coil winding for eliminating measuring inaccuracies by said sensor due to action of said spring; said sensor winding surrounding said piston rod below said traction limiter; said magnet being mounted against an inner surface of said cylindrical tube.

* * * * *